Nov. 1, 1966 R. A. FRECHETTE 3,282,420
TESTING AND SORTING MACHINE FOR ELECTRONIC COMPONENTS
Filed Jan. 11, 1963 4 Sheets-Sheet 1
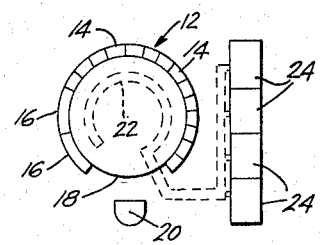
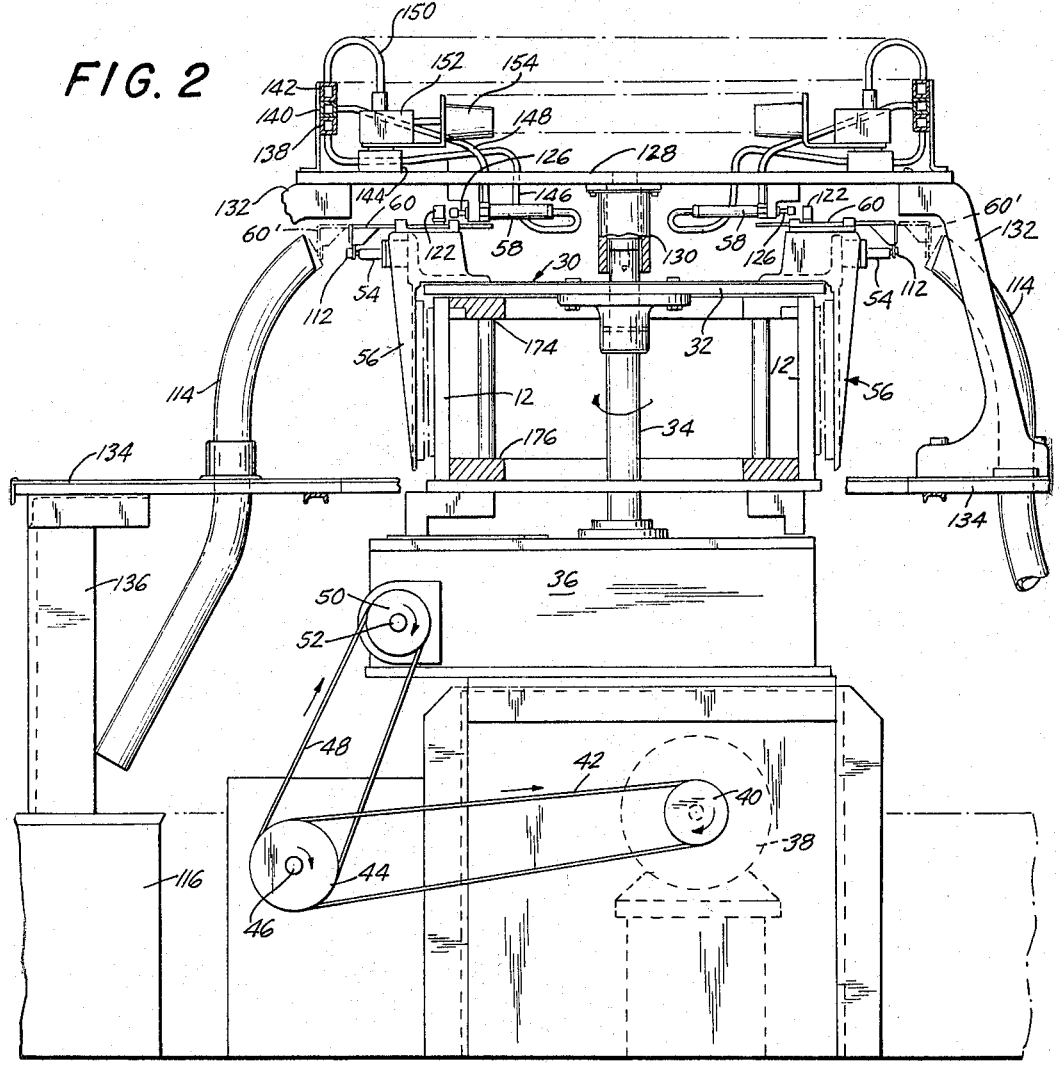
INVENTOR.
RAYMOND A. FRECHETTE
BY James and Franklin
ATTORNEYS

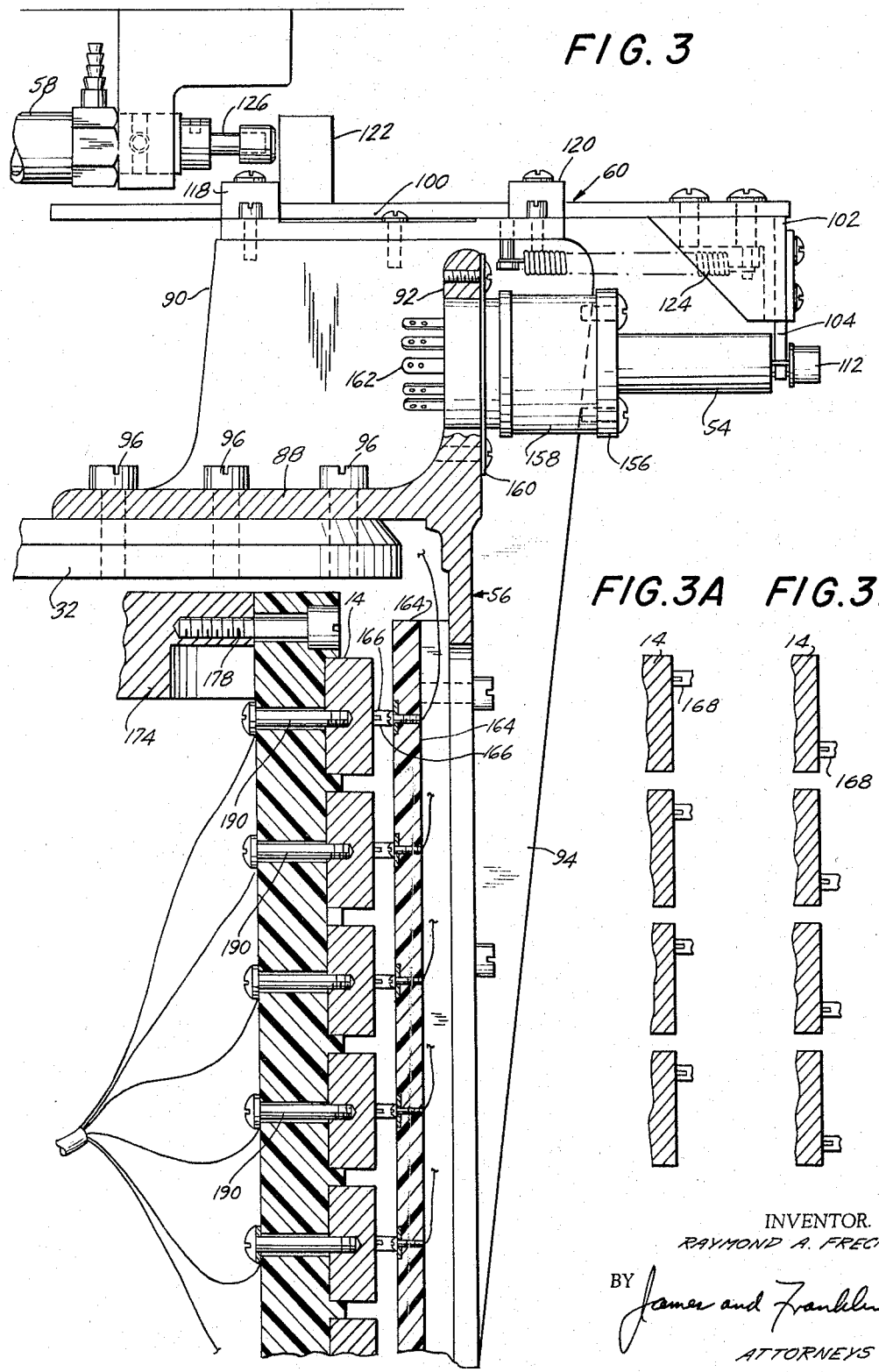

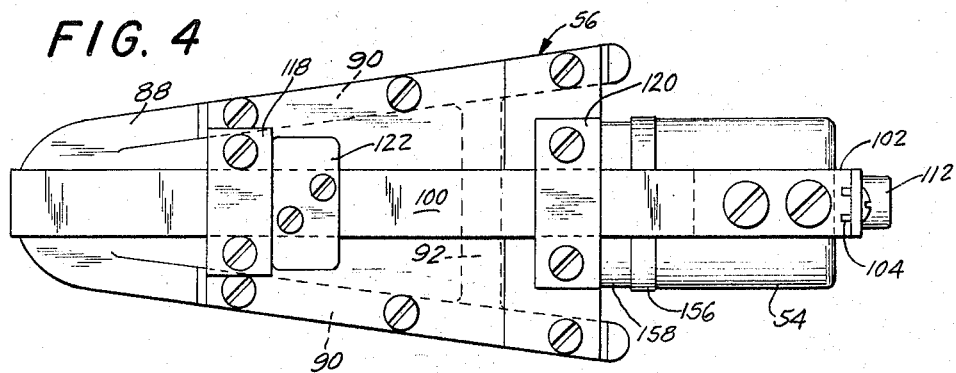
FIG. 4
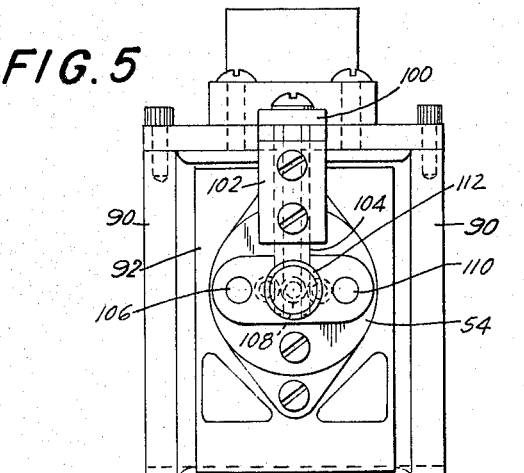
FIG. 5
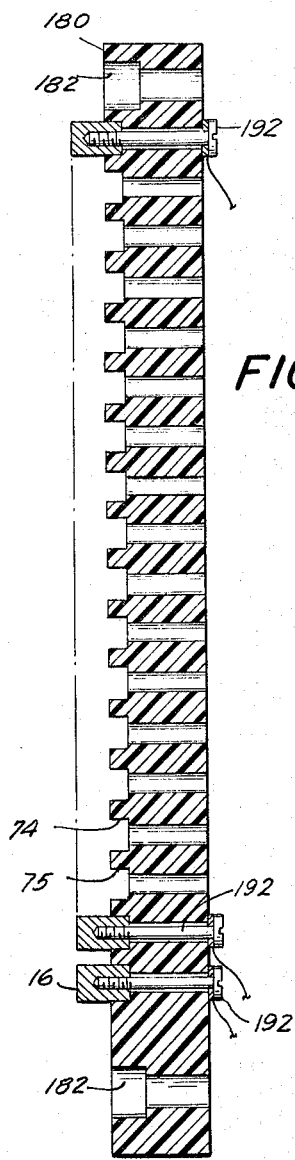
FIG. 6
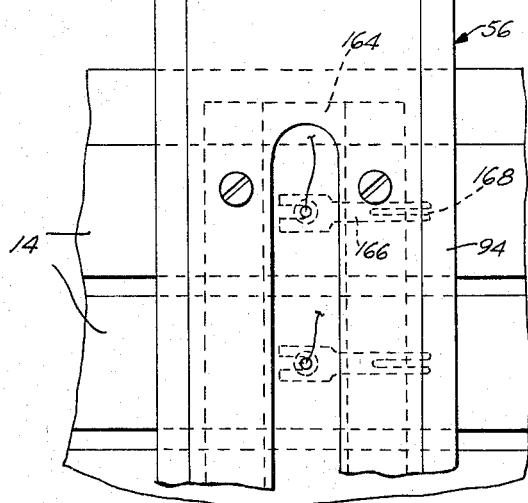

Nov. 1, 1966  R. A. FRECHETTE  3,282,420
TESTING AND SORTING MACHINE FOR ELECTRONIC COMPONENTS
Filed Jan. 11, 1963  4 Sheets-Sheet 4
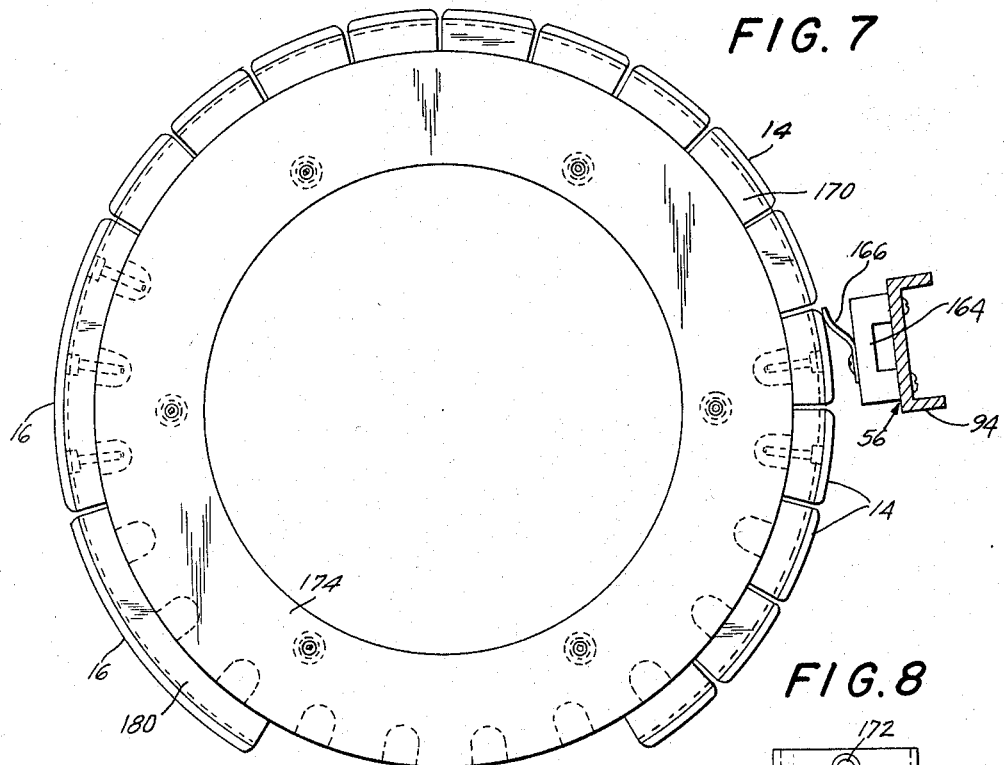
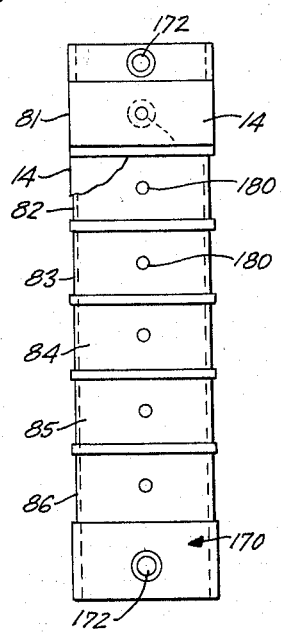
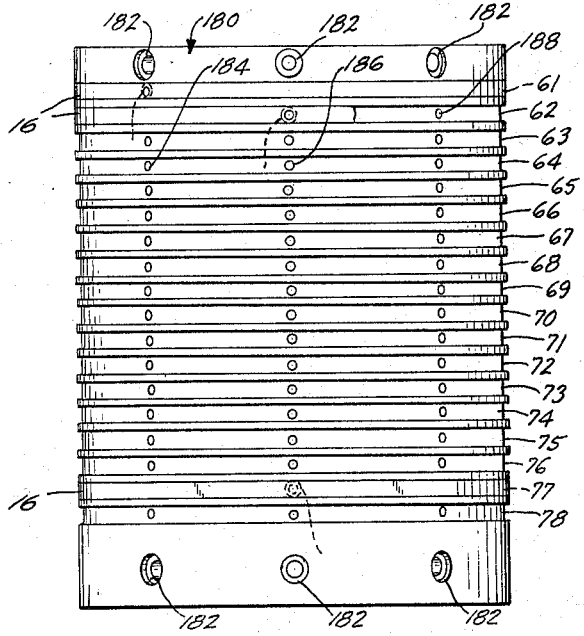
INVENTOR.
RAYMOND A. FRECHETTE
BY James and Franklin
ATTORNEYS

United States Patent Office

3,282,420
Patented Nov. 1, 1966

3,282,420
TESTING AND SORTING MACHINE FOR
ELECTRONIC COMPONENTS
Raymond A. Frechette, Woonsocket, R.I., assignor to
General Instrument Corporation, Newark, N.J., a corporation of New Jersey
Filed Jan. 11, 1963, Ser. No. 250,865
13 Claims. (Cl. 209—75)

This invention relates to testing and sorting machines for electronic components, and more particularly to such a machine of the high speed turret type.

Electronic components may be subjected to many tests. Most of these are fast tests. In the case of transistors as here illustrated, there are say fourteen such tests which may be performed rapidly. It is desirable to sort the transistors in accordance with which test has been failed, because transistors may be utilized for many less severe purposes despite failure of some tests.

Test apparatus is already known which employs an intermittently rotated turret, with an operator seated at a loading station in front of the turret to insert transistors one after another in sockets disposed around the turret. There is also a ring of bins or boxes around the turret, and ejection means to eject a transistor at a failed test, into the appropriate box for that failed test.

In addition to the foregoing quick tests it is also desirable to subject a component to one or more slow tests. In the present case the transistor is preferably given two drift tests, one between the collector and the base, and the other between the emitter and the base. A drift test takes say three times as long as one of the other fourteen tests. To provide a drift test on the turret machine would slow down the operation of the machine to say one-third speed. To avoid this fractional utilization of elaborate and expensive equipment, it has been the practice heretofore to make drift test separately, by a different operator seated at different apparatus. This has proved troublesome and inconvenient, and requires increased handling of the transistor for insertion of its leads into additional sockets.

The primary and general object of the present invention is to retain all of the advantages of a turret type testing and sorting machine, including its high speed operation, and yet to provide for additional slow tests in the same machine.

To accomplish the foregoing general object, and other more specific objects which will hereinafter appear, my invention resides in the testing and sorting machine elements, and their relation one to another, as are hereinafter more particularly described in the following specification. The specification is accompanied by drawings in which:

FIG. 1 is a highly schematic plan view explanatory of one general arrangement of the apparatus;

FIG. 2 is a partially sectioned elevation showing a machine embodying features of the present invention;

FIG. 3 is a vertical section drawn to larger scale, and taken through a peripheral portion of the turret and stationary cylinder within the turret;

FIGS. 3A and 3B show different brush locations in the arrangement shown in FIG. 3;

FIG. 4 is a plan view of one of the ejector and socket assemblies carried by the turret;

FIG. 5 is a front elevation of the upper part of the sub-assembly shown in FIG. 4;

FIG. 6 is a vertical section through that part of the stationary drum which has narrow contact segments;

FIG. 7 is a plan view of the stationary drum with its short and long segments;

FIG. 8 is a front elevation of an insulation holder for short wide contact segments; and FIG. 9 is a front elevation of an insulation holder for long narrow contact segments.

Referring to the drawing, and more patricularly to FIG. 1, a stationary contact cylinder which is located within the rotatable turret (not shown) is symbolized at 12, it comprising short segments 14 and long segments 16. A portion of the drum at 18 is devoid of segments, and acts as a loading station. An operator sits on a chair indicated at 20, and inserts components (in this case transistors) in an intermittently rotated turret. Stationary wiring extends from the stationary segments 14 and 16 through a conduit or harness, indicated in broken lines at 22, to test equipment 24. The test equipment may comprise many individual test panels, mounted in upright racks having a height of say six feet. FIG. 1 shows the tops of four such racks.

In the specific case here shown, the sort segments 14 have a length of fifteen degrees, and the turret is advanced in fifteen degree steps. There are fourteen short segments corresponding to fourteen short tests, and two long segments which have an arcuate length of forty-five degrees, for two long tests. The contact segments occupy three-hundred degrees, the remaining sixty degrees being used for the loading station at 18. There are twenty-four sockets around the turret at fifteen degree intervals.

Referring now to FIG. 2, the intermittently rotatable turret is shown at 30, it comprising a circular top plate 32, carried on a vertical shaft 34, the latter being intermittently indexed or rotated by Geneva gear mechanism which may be of conventional type and which is housed in a gear box 36. The gear mechanism is driven by a motor 38 driving a pulley 40 and a belt 42 which drives a pulley 44 forming part of a clutch brake mechanism, the shaft of which is indicated at 46. The clutch brake drives a pulley (not shown) carrying a belt 48 which drives a pulley 50 and shaft 52 which is the input shaft of the Geneva gear mechanism.

Turret plate 32 carries sockets 54 to receive the components or transistors. It also carries depending brush holders generally designated 56, each of which has a plurality of superposed brushes for each socket, and there are electrical connections between the socket and the brushes.

Within the turret there is a stationary cylinder 12 of arcuate contact segments which are slidably engaged by the brushes. A group of superposed segments corresponds to a test station, and there is test equipment connected to the segments as mentioned in connection with FIG. 1.

At the test stations there are stationary ejection actuators 58 to actuate turret ejectors 60. This actuation takes place at a station corresponding to a failed test.

Referring now to FIGS. 7 and 8, most of the metal segments 14 are short in arcuate length and wide in axial direction. They are carried on an upright insulation bar 170, and most of the segments 14 are omitted in FIG. 8, though shown in FIG. 3. Each brush holder 56 (FIGS. 2–5) has one brush for each superposed segment. However, the brushes of one holder are at a different height, relative to the wide segments, than those of another holder, this being clear from a comparison of FIGS. 3, 3A and 3B. In the present case the brushes are at high, intermediate, and low positions, the intermediate position being shown in FIG. 3, and the high and low positions being shown in FIGS. 3A and 3B respectively.

Referring now to FIGS. 7 and 9, the remaining metal segments 16 are long in arcuate length and narrow in axial direction. They are carried on an insulation holder 180. They are so positioned in axial direction as to be engaged by the brushes of one holder or another. A brush holder with brushes in the high position shown in FIG. 3A would engage the segments at 61, 64, 67, 70, 73 and 76 in FIG. 9. The holder 56 shown in FIG. 3, with its intermediate height brushes, would engage the segments at 62, 65, 68, 71, 74 and 77 in FIG. 9. A brush holder with the brushes in the low position shown in FIG. 3B would engage the segments at 63, 66, 69, 72, 75 and 78 in FIG. 9.

On the other hand, because of their width, the short segments shown in FIG. 8 are engaged by the brushes of any of the three types of brush holder.

In FIG. 8 it will be seen that the insulation segment and the cylinder are six segments high. In simpler form it would be three segments high, when testing a component which has three leads, it being understood that each of the three contacts in the socket has an electrical conductor leading down to one of the segments. In the case of a transistor this establishes contact with the emitter, the base, and the collector of the transistor.

For more accurate test purposes it is preferred to feed power to the transistor through a brush, contact segment and lead, separate from that used to sense the test response of the transistor. I therefore provide six superposed segments, and brushes, instead of three. In the particular case here shown, the segment 81 (FIG. 8) is used for emitter power, the segment at 82 for emitter sense, the segment at 83 for base power, the segment at 84 for base sense, the segment at 85 for collector power, and the segment at 86 for collector sense. The term "base power" refers to the supply of test input to the base; the term "base sense" refers to the output or response from the base; the term "emitter power" refers to the supply of test input to the emitter; and so on.

The top plate 32 of the turret carries twenty-four subassemblies mounted therearound, and one of these is shown in FIGS. 3, 4 and 5. It comprises an aluminum casting having a mounting portion 88 with a slide pedestal or support 90, an upward extension 92 between two spaced supports 90, and a depending arm 94. The mounting part 88 is secured to the turret plate 32, as by means of screws 96. The walls 90 carry an ejector assembly which includes a slide rod 100 disposed radially of the turret, and carrying a head 102 with depending ejector fingers 104.

Referring to FIG. 5, the socket 54 has three openings here disposed in horizontal relation, indicated at 106, 108 and 110, and the ejector fingers 104 are located between the openings 106, 108 and 110, and therefore behind the transistor 112 being tested, so that outward movement of the ejector fingers ejects the transistor from the socket. If the openings were aligned vertically, the fingers would straddle the openings. The fingers are made of insulation material.

Reverting to FIG. 2, ejection is indicated by the change from the solid line position 60 to the broken line position 60'. An ejected transistor is propelled into a tube or chute 114 which guides it to a box or bin 116. It will be understood that there is a ring of such boxes around the base of the machine at fifteen degree intervals, each box corresponding to one test station. At the long segments there are two boxes at 45° intervals, the chute being near the end of its long segment.

Referring now to FIGS. 4 and 5, the slide rod 100 slides in bearings 118, 120. It carries an upwardly projecting block 122. It is normally pulled radially inward by a return spring or pull spring indicated at 124 in FIG. 3. Its inward movement is limited by the block 122 which acts as a stop block when it bears against the bearing 118.

The ejectors are operated by stationary actuators located at the different stations, that is, fifteen degrees apart. Referring to FIG. 2, in the example here shown, the actuator 58 is an air cylinder having a plunger 126 disposed radially of the turret, and when energized the actuator strikes the block 122 and so moves the ejector outward from the solid line to the broken line position. The top plate 128 of the machine is stationary, it carrying a bearing 130 for the upper end of the shaft 34. Plate 128 is supported on fixed struts 132, which in turn are secured to a frame plate 134 carried on legs 136. The plate 134 also carries the discharge chutes 114. The actuators 58 are secured to mounting blocks carried beneath the top plate 128.

In the present case the actuators are air cylinders having a low pressure air return acting like a return spring, and such springs could be used. To supply air to the cylinders the stationary plate 128 carries three stationary rings of pipe or conduit indicated at 138, 140 and 142. Each acts as a manifold, and has pipe connections at fifteen degree intervals. In the present case the duct 138 carries air at high pressure, say sixty pounds per square inch, and this is fed through a valve 144 and pipe 146 to the inner end of the actuator 58. The conduit 140 carries air at low pressure, say twenty pounds per square inch, and this is constantly connected through a pipe 148 to the outer end of the actuator. The duct 142 is an exhaust duct and is connected by a pipe 150 to the valve 144. The latter is actuated by a solenoid 152, which in turn is controlled by a relay 154, and that in turn is controlled by a signal sent to it from the test equipment (24 in FIG. 1). When a transistor is moved by the turret to a particular station and there dwells, it is supplied with power and its response is measured by an appropriate test kit connected to receive signals from that station, and if the transistor fails the test, it is ejected and collected in a box at that station. This is all done quickly, the machine having a typical cycle time of say 1½ seconds, the turret being indexed or stepped ahead every 1½ seconds. The time used for actual test is less.

Referring to FIGS. 3 and 4, the transistor socket 54 extends outwardly from a base 156 secured to a support 158 which has a base plate 160 (FIG. 3) which is mounted on the upward extension 92 previously referred to. The soldering lugs shown at 162 are connected by wires to the brushes previously mentioned. In the present case each of the three socket contacts leads to two soldering lugs 162 and two conductors running downward to two brushes, but one lug, wire, and brush could be used, as previously mentioned.

The depending arm 94 has stiffening ribs which taper downwardly from the spaced pedestal walls 90. The arm 94 carries an insulation strip 164, which in turn carries the brushes 166. Strip 164 is preferably channel sectioned, as shown in FIG. 7. Referring now to FIGS. 5 and 7, the brush 166 may be made of thin phosphor bronze with a silver alloy contact tip. The base is secured to the insulation strip by means of a suitable mounting screw which may serve also for electrical connection. The free end of the brush is preferably bifurcated, as shown at 168 in FIG. 5, to form two independently yieldable contact fingers, thereby better assuring dependable contact with the contact segment. Each branch has an alloy contact, selected for low resistance and long wear.

The metal contact segments located at 81–86, shown in FIG. 8, are carried on an insulation base 170 which is preferably arcuate, and which has main mounting holes 172 at the top and bottom. These receive mounting screws located at fifteen degree intervals around the stationary top and bottom rings 174 and 176 (FIG. 2). One such mounting screw is shown at 178 in FIG. 3. The insulation material is preferably recessed slightly to receive the metal contact segments, and the latter are secured in position by means of screws passing from the rear through holes indicated at 180. In FIG. 8 some of the metal segments have been applied, and some omitted. The screws are shown at 190 in FIG. 3.

Referring now to FIG. 9, the long narrow segments are similarly mounted on an arcuate insulation base 180. In this case the insulation base has an arcuate length of forty-five degrees instead of fifteen degrees, and has three mounting holes 182 at the top and three similar holes at the bottom. These receive mounting screws like the screw 178 in FIG. 3, and the screws are received in the same holes previously mentioned, which are located at fifteen degree intervals, so that any desired combination of short and long segments may be mounted anywhere around the stationary rings 174, 176 (FIGS. 2 and 7).

The insulation support 180 is horizontally grooved to receive eighteen long narrow contact segments, and each segment is mounted in position by means of screws passing from the rear through three holes 184, 186 and 188. The contact segments may be mounted by screws of any desired number and location, but it is convenient to adhere to the fifteen degree intervals already established.

The mounting of some of the long narrow segments is shown by the screws 192 in FIG. 6. In FIG. 3 each screw 190 serves also as an electrical connection to its short wide contact segment. In FIG. 6 one of the three screws of each segment is used for that purpose, and to assist a workman in wiring or servicing the machine, the connections to the first, fourth and seventh, etc. segment may be made to the first vertical line of screws; the connections to the second, fifth and eighth, etc. segments may be made to the second vertical line of screws; and the connections to the third, sixth, and ninth, etc. segments, may be made to the third vertical line of screws. This wiring arrangement is not essential, and is merely a convenience. The holes for the three vertical lines of screws are indicated at 184, 186 and 188 in FIG. 9.

It will be understood that all of the stationary wiring may descend inside the stationary cylinder, and then be led outwardly, say at floor level, to the large panels of test circuitry, as suggested at 22 in FIG. 1.

Of course, the return wiring from the test panels to the relays 154 at the top of the machine, which relays control the ejectors, may run through a wiring conduit at overhead level. If the return is at floor level, the riser would not be located inside the cylinder, but rather would be outside the cylinder and preferably at one of the stationary support struts such as those shown at 132 in FIG. 2.

In operation the operator is seated in front of the machine and inserts transistors into successive sockets as they dwell momentarily in front of her. The leads of each transistor are straightened or separated somewhat, enough to be inserted in the three preferably enlarged convergent holes of the socket. A transistor thus inserted is disposed against the two spaced ejector fingers 104. Assuming the turret rotates counterclockise, when the transistor reaches the first test station and dwells, it is subjected to a first test, and passing that test, moves on to the second test station where it is subject to a second test, and so on. In this way the transistor is subjected to fourteen quick tests. The first transistor may be connected to brushes in one position, say the high position; the next transistor would then be connected to brushes in the intermediate position; the third transistor would be connected to brushes in the low position; the fourth transistor would be connected to brushes again in the high position; and so on.

Every third transistor around the turret is connected to high brushes; the next series of every third transistors is connected to the intermediate brushes, and the next series of every third transistors is connected to the low brushes; and so on. During the fourteen short tests this difference is of no consequence at all, because a brush, whether high, intermediate or low, engages a wide contact segment, and the segment is indifferent to the position of the brush.

If the transistor fails any test it is ejected at that test station and is received in an appropriate box. The transistors are thus sorted or classified as well as tested, and the particular test in the series which has been failed is known by the box into which it is delivered. However, if the transistor passes all fourteen tests (or less, if the machine is set up for less stringent testing by making certain test kits inoperative), the transistor moves on to the two longer tests, in this case, "drift" tests.

When the first transistor reaches the long narrow segments for the first drift test, it is connected to the first, fourth, seventh, etc. contact segments, and these lead to a first test kit for the drift test. The test is maintained for the duration of three test cycles, or in this case 4½ seconds instead of 1½ seconds, and it is only at the termination of the drift test, that is, in the test station corresponding to the end of the long contact segment, that the ejector is operated if the test is failed. It will be understood that there is no ejector actuator for the first and second stations of the three stations occupied by the long segment. In the alternative, actuators may be provided but disconnected to make them inoperative, if the machine is to be built for flexible use, making possible the mounting of short wide contact segments in lieu of the long narrow ones, should additional short tests be wanted in lieu of the long tests, or should a change in test sequence be wanted.

When the second transistor being tested reaches the drift test, it is connected to the second, fifth, and ninth, etc. segments, which in turn lead to another drift test kit. Similarly, when the third transistor reaches the drift test it is connected to the third, sixth, and ninth, etc. segments, which are connected to a third drift test kit. When the fourth transistor reaches the drift test it is connected to the first, fourth and seventh segments, but by that time the first transistor has already left the first drift test and has begun the second drift test. For a second drift test there are fourth, fifth, and sixth test kits corresponding to the high, intermediate and low brushes on the turret.

It is believed that the construction and operation of my improved testing and sorting machine for electronic components, as well as the advantages thereof, will be apparent from the foregoing detailed description. In the actual machine illustrated, the turret rotates clockwise rather than counterclockwise, as is indicated by the arrow in FIG. 1, and by the position of the spring contact 166 shown in FIGS. 5 and 7. This means only that the two long drift tests take place before the fourteen short tests. The sequence was reversed in the foregoing description so that the description would develop logically from the simpler contact operation to the more complex contact operation. It will also be apparent that by following the described principles of construction, a long test might be two times as long or four times as long, etc. as the short test, instead of being three times as long as here illustrated. It will also be understood that the indexing angle of fifteen degrees is not critical. A smaller turret with a larger indexing angle might be used for a lesser number of tests, or a larger turret with a smaller indexing angle might be used for a larger number of tests. The same indexing angle may be used for a smaller number of tests by simply letting some stations be idle. In theory the aligned segments for a test station might be aligned radially at progressive radius, the segments then being disposed on a circular plate instead of on a cylinder, but it is believed more compact and more practical to arrange the segments on a cylinder, as here shown.

It should be understood that the stationary cylinder may be located outside instead of inside the turret, in which case the brushes would be on the outside of the turret instead of on the inside, and the arcuate contact segments would be concave instead of convex, and would be located on the inside instead of on the outside of the stationary cylinder. In most machines using relatively rotatable slip rings and brushes, the parts may be reversed, that is, the brushes may be stationary and the contact segments rotatable, or vice-versa, but such is not so simply the case where there are both short and long segments. For the segments to rotate it would be necessary to make all of the segments equal in arcuate length, and to employ for the long test three peripherally spaced brushes connected together to act as a common brush. A single brush would serve for the short test. In this way both short and long tests could be provided while using segments of equal arcuate length corresponding to uniformly spaced transistor sockets around the turret for receiving the transistors.

It will be apparent that while I have shown and described my invention in a preferred form, changes may be made in the structure shown without departing from the scope of the invention, as sought to be defined in the following claims.

I claim:
1. A testing machine for electronic components, said machine comprising an intermittently rotatable turret carrying sockets to receive the components, a brush holder having a plurality of brushes for each socket, and connections between the sockets and the brushes, a stationary cylinder of arcuate contact segments to be slidably engaged by said brushes, the contact segments corresponding to test stations, test equipment connected to said segments, some segments being short in arcuate length and wide in axial direction, each brush holder having one brush for each contact segment, the brushes of one holder being at a different height relative to the wide segments than those of another holder, some segments being long in arcuate length and narrow in axial direction, and so positioned in axial direction as to be engaged by the brushes of one holder or another.

2. A testing and sorting machine for electronic components, said machine comprising an intermittently rotatable turret carrying sockets to receive the components, an ejector at each socket, a brush holder having a plurality of brushes for each socket, and connections between the sockets and the brushes, a stationary cylinder of arcuate contact segments to be slidably engaged by said brushes, the contact segments corresponding to test stations, test equipment connected to said segments, ejection acuators at the test stations, means to actuate one of the aforesaid turret ejectors at that station, some segments being short in arcuate length and wide in axial direction, each brush holder having one brush for each contact segment, the brushes of one holder being at a different height relative to the wide segments than those of another holder, some segments being long in arcuate length and narrow in axial direction, and so positioned in axial direction as to be engaged by the brushes of one holder or another.

3. A testing machine as defined in claim 1, in which the long segments are three times as long as the short segments, and in which the short segments are three times as wide as the long segments, and in which the brush holders carry the brushes at high, intermediate and low positions to engage different narrow segments.

4. A testing and sorting machine as defined in claim 2, in which the long segments are three times as long as the short segments, and in which the short segments are three times as wide as the long segments, and in which the brush holders carry the brushes at high, intermediate and low positions to engage different narrow segments.

5. A testing machine as defined in claim 1, in which the long segments are three times as long as the short segments, and in which the short segments are three times as wide as the long segments, and in which the brush holders carry the brushes at high, intermediate and low positions to engage different narrow segments, and in which there are three like test kits for the test which is of triple length.

6. A testing and sorting machine as defined in claim 2, in which the long segments are three times as long as the short segments, and in which the short segments are three times as wide as the the long segments, and in which the brush holders carry the brushes at high, intermediate and low positions to engage different narrow segments, and in which there are three like test kits for the test which is of triple length.

7. A testing machine as defined in claim 1, in which the short wide segments have an arcuate length of fifteen degrees, and in which the long narrow segments have an arcuate length which is a desired multiple of fifteen degrees, and in which the turret is indexed in fifteen degree increments, there being twenty-four sockets and twenty-four brush holders around the turret.

8. A testing and sorting machine as defined in claim 2, in which the short wide segments have an arcuate length of fifteen degrees, and in which the long narrow segments have an arcuate length which is a desired multiple of fifteen degrees, and in which the turret is indexed in fifteen degree increments, there being twenty-four sockets and twenty-four brush holders around the turret.

9. A testing machine as defined in claim 1, in which the short wide segments have an arcuate length of fifteen degrees, and in which the long narrow segments have an arcuate length of forty-five degrees, and in which the turret is indexed in fifteen degree increments, there being twenty-four sockets and twenty-four brush holders around the turret, the wide segments being three times as wide as the narrow segments, and the brush holders carrying the brushes at high, intermediate, and low positions.

10. A testing and sorting machine as defined in claim 2, in which the short wide segments have an arcuate length of fifteen degrees, and in which the long narrow segments have an arcuate length of forty-five degrees, and in which the turret is indexed in fifteen degree increments, there being twenty-four sockets and twenty-four brush holders around the turret, the wide segments being three times as wide as the narrow segments, and the brush holders carrying the brushes at high, intermediate, and low positions.

11. A testing machine as defined in claim 1, in which the components being tested are transistors having emitter, base, and collector leads, and in which each socket has three contacts, and in which each brush holder has six brushes engaging six contact segments, two for emitter power and emitter sense, two for base power and base sense, and two for collector power and collector sense.

12. A testing and sorting machine as defined in claim 2, in which the components being tested are transistors having emitter, base, and collector leads, and in which each socket has three contacts disposed horizontally, and in which each brush holder has six brushes engaging six contact segments, two for emitter power and emitter sense, two for base power and base sense, and two for collector power and collector sense.

13. A testing machine for electronic components, said machine comprising an intermittently rotatable turret carrying sockets to receive the components, a brush holder having a plurality of brushes for each socket, and connections between the sockets and the brushes, a stationary array of arcuate contact segments to be slidably engaged by said brushes, the contact segments corresponding to test stations, test equipment connected to said segments, some segments being short in arcuate length and wide in transverse direction, each brush holder having one brush for each contact segment, the brushes of one holder being at a different transverse distance relative to the wide segments than those of another holder, some segments being long in arcuate length and narrow in transverse direction, and so positioned in transverse direction as to be engaged by the brushes of one holder or another.

References Cited by the Examiner
UNITED STATES PATENTS

| | | | |
|---|---|---|---|
| 2,617,527 | 11/1952 | Smith | 209—81 X |
| 3,094,212 | 6/1963 | Moore et al. | 209—81 X |

M. HENSON WOOD, JR., *Primary Examiner.*

J. N. ERLICH, *Assistant Examiner.*